United States Patent
Ishino

(10) Patent No.: US 11,817,649 B2
(45) Date of Patent: Nov. 14, 2023

(54) CORROSION-PROOF STRUCTURE FOR CONNECTORS

(71) Applicant: HONDA MOTOR CO., LTD., Tokyo (JP)

(72) Inventor: Kotaro Ishino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 17/680,660

(22) Filed: Feb. 25, 2022

(65) Prior Publication Data

US 2022/0320793 A1 Oct. 6, 2022

(30) Foreign Application Priority Data

Mar. 31, 2021 (JP) ................. 2021-059800

(51) Int. Cl.
*H01M 50/543* (2021.01)
*H01R 13/533* (2006.01)
*B60L 1/00* (2006.01)

(52) U.S. Cl.
CPC ........ *H01R 13/533* (2013.01); *H01M 50/543* (2021.01); *B60L 1/003* (2013.01); *H01R 2201/26* (2013.01)

(58) Field of Classification Search
CPC .. H01R 13/533; H01R 2201/26; H01R 13/52; H01R 13/5213; H01R 13/5205; H01R 13/5221; H01R 13/516; H01M 50/543; H01M 50/24; H02G 3/088; H02G 3/0691
See application file for complete search history.

(56) References Cited

U.S. PATENT DOCUMENTS

| | | | | | |
|---|---|---|---|---|---|
| 3,209,061 | A | * | 9/1965 | Mier ...................... | H02G 15/18 439/367 |
| 4,869,683 | A | * | 9/1989 | Nelson ............... | H01R 13/5213 439/367 |
| 5,041,000 | A | * | 8/1991 | Shotey ............... | H01R 13/5213 439/367 |
| 5,300,734 | A | * | 4/1994 | Suzuki .................. | H01R 13/56 174/152 G |
| 6,123,568 | A | * | 9/2000 | Bullough ............. | H01R 13/567 439/445 |
| 6,126,477 | A | * | 10/2000 | Smith ................ | H01R 13/6592 439/447 |
| 6,162,087 | A | * | 12/2000 | Hiura ................. | H01R 13/5213 174/152 G |
| 7,419,402 | B2 | * | 9/2008 | Carnahan ........... | H01R 13/5841 439/470 |
| 7,988,475 | B2 | * | 8/2011 | Sakakura ............. | H01R 13/748 439/271 |

(Continued)

FOREIGN PATENT DOCUMENTS

| | | | | |
|---|---|---|---|---|
| GB | 2422731 A | * | 8/2006 | ......... H01R 13/5213 |
| JP | H07-326422 A | | 12/1995 | |
| JP | H11-26062 A | | 1/1999 | |

*Primary Examiner* — Tho D Ta
(74) *Attorney, Agent, or Firm* — Rankin, Hill & Clark LLP

(57) ABSTRACT

A corrosion prevention structure for connectors includes: a boot which covers plural connectors for power distribution to be concentrated together on a front side of a battery and through which plural cables extending respectively from the plural connectors are inserted; and a clamp which tightly binds the plural cables over the boot.

3 Claims, 3 Drawing Sheets

(56) References Cited

U.S. PATENT DOCUMENTS

| | | | | |
|---|---|---|---|---|
| 8,241,062 | B2* | 8/2012 | Tsuruta | H01R 13/4367 |
| | | | | 439/352 |
| 8,378,212 | B2* | 2/2013 | Sturges | H02G 15/14 |
| | | | | 174/50.56 |
| 8,562,377 | B2* | 10/2013 | Kawamura | H01R 13/5205 |
| | | | | 439/607.44 |
| 10,135,175 | B2* | 11/2018 | Aoshima | H01R 13/6485 |
| 10,411,402 | B2* | 9/2019 | Fujiki | B60R 16/0215 |
| 10,457,317 | B2* | 10/2019 | Takagi | B62D 5/0409 |
| 2010/0261363 | A1* | 10/2010 | Sakakura | H01R 4/34 |
| | | | | 439/271 |

* cited by examiner

CORROSION-PROOF STRUCTURE FOR CONNECTORS

CROSS-REFERENCE TO RELATED APPLICATIONS

The present application claims priority under 35 U.S.C. § 119 to Japanese Patent Application No. 2021-059800, filed Mar. 31, 2021, the contents of which are hereby incorporated by reference in their entirety.

BACKGROUND OF THE INVENTION

1. Field of the Invention

The present invention relates to a corrosion prevention structure for connectors.

2. Description of the Related Art

Generally, a drive battery of an electric vehicle (EV) is arranged below a floor panel in many cases. A portion around power distribution connectors that are concentrated on the front side of such a battery is exposed under an environment where there is a risk of occurrence of corrosion due to mud splash, water attachment, rust received from other parts, or exposure to hot air from a radiator.

There have been conventional a waterproof connector in which connectors formed of a cap connector and a plug connector are fastened to each other with a bolt with a sealing rubber arranged between the connectors (for example, see JP Hei 7-326422A) and a waterproof connector in which a boot is attached to a harness-side connector (for example, see JP Hei 11-26062A).

SUMMARY OF THE INVENTION

In order to prevent corrosion of power distribution connectors in an electric vehicle, application of a conventional waterproof connector (for example, see JP Hei 7-326422A and JP Hei 11-26062A) is conceivable.

However, the conventional waterproof connector (for example, see JP Hei 7-326422A and JP Hei 11-26062A) that includes the sealing rubber or the boot tends to have a larger size than a normal connector that does not have a waterproof function. Accordingly, when the conventional waterproof connector is to be applied to the power distribution connectors concentrated on the front side of the battery, wire routing in a portion around the connectors and work smoothness in connection of male and female connectors are hindered. In order to solve such problems, using a corrosion-resistant material for the power distribution connectors without using the sealing rubber or the boot or performing corrosion prevention treatment such as anodizing treatment on the connectors is conceivable. However, the connectors using the corrosion-resistant material or the connectors subjected to the corrosion prevention treatment have a problem of even higher cost than that of the normal connector.

An object of the present invention is to provide a corrosion prevention structure for connectors that is low in cost and that does not hinder wire routing in a portion around the connectors and work smoothness in connection of the connectors to each other.

A corrosion prevention structure for connectors includes: a boot that covers plural connectors for the power distribution to be concentrated together on a front side of a battery and through which plural cables extending respectively from the plural connectors are inserted; and a clamp that tightly binds the plural cables over the boot.

The present invention provides a corrosion prevention structure for connectors that is low in cost and that does not hinder wire routing in a portion around the connectors and work smoothness in connection of the connectors to each other.

DETAILED DESCRIPTION OF THE EMBODIMENTS

Next, a corrosion prevention structure for connectors (hereinafter, simply referred to as corrosion prevention structure in some cases) according to an embodiment of the present invention is described in detail with reference to the drawings as appropriate. Directions of front, rear, up, and down in the following description are based on the directions of arrows illustrated in FIG. 1 and matching directions of front, rear, up, and down of the vehicle. Moreover, directions of left and right are based on the directions of arrows illustrated in FIG. 2 and matching directions of left and right of the vehicle.

In the following description, an overall configuration of a vehicle in which the corrosion prevention structure is implemented is described first and then the corrosion prevention structure is described.

<Vehicle>

Figure 1:
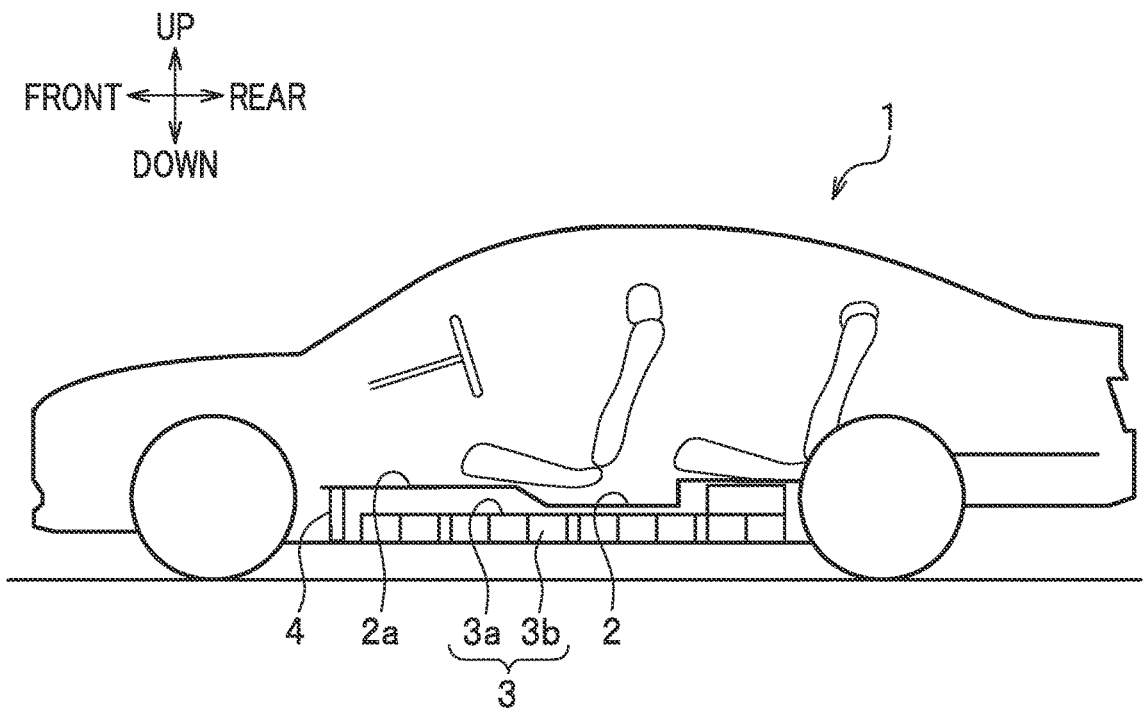
FIG. 1 is a configuration explanation view of a vehicle including a corrosion prevention structure for connectors according to an embodiment of the present invention.

FIG. 1 is a schematic view for explaining the overall configuration of a vehicle 1.

The vehicle 1 in the embodiment is assumed to be an electric vehicle (EV) but the present invention can be applied also to other vehicles such as a hybrid vehicle.

As illustrated in FIG. 1, the vehicle 1 includes a battery pack 3 provided below a floor panel 2 and a distribution board 4 arranged to face a front opening of a center tunnel 2a.

Both end portions of the floor panel 2 in a vehicle width direction are laid on left and right-side sills (not shown) and the floor panel 2 thereby forms a floor portion of a vehicle cabin.

The battery pack 3 includes a battery case 3a, multiple case cross members (not shown), and multiple battery cells 3b formed of lithium-ion batteries or solid-state batteries.

Although illustration is omitted, a left portion of the battery case 3a is attached to the left side sill via a left side frame and a right portion of the battery case 3a is attached to the right-side sill via a right-side frame. Moreover, a top portion of the battery case 3a is connected to the floor panel 2 via multiple connection members (not shown).

The center tunnel 2a is a portion formed by having the floor panel 2 forming the floor portion of the vehicle cabin as described above partially bulge upward in a tunnel shape at a center portion in the vehicle width direction. The center tunnel 2a extends in the front-rear direction at the center portion in the vehicle width direction. The distribution board 4 to be described next is arranged in a front opening of the center tunnel 2a as described above to face forward.

Figure 2:
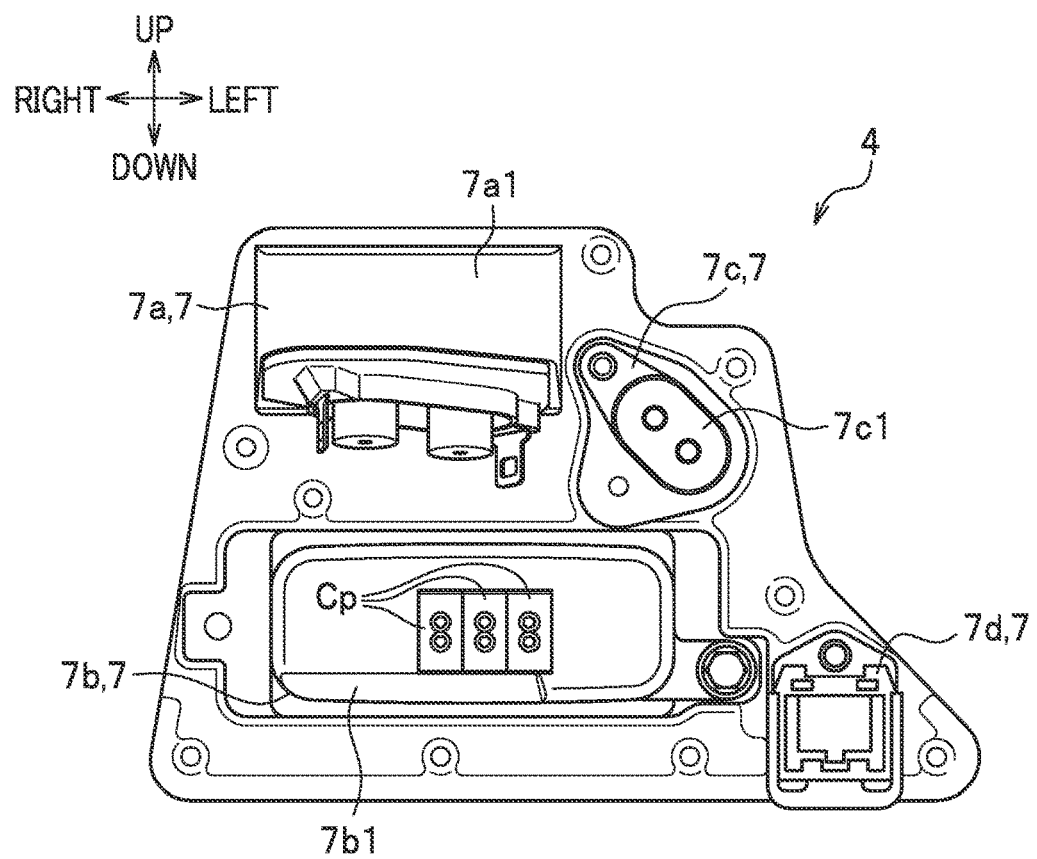
FIG. 2 is a top view of a distribution board including multiple power distribution connectors in the vehicle illustrated in FIG. 1.

FIG. 2 is a front view of the distribution board 4 in the embodiment.

As illustrated in FIG. 2, the distribution board 4 has a trapezoidal shape having legs on left and right sides to correspond to the shape of the front opening of the center tunnel 2a (see FIG. 1).

In the distribution board 4, multiple power distribution connectors 7 are concentrated at the center portion in the vehicle width direction and in front of the battery pack 3 (see FIG. 1).

Specifically, the power distribution connectors 7 include a first connector 7a, a second connector 7b, a third connector 7c, and a fourth connector 7d.

The first connector 7a includes a substantially cuboid base portion 7a1 arranged on the upper base (short base) side of the trapezoidal shape in the distribution board 4.

A cable-side connector 5a (see FIG. 3) of a cable 6a (see FIG. 3) used for quickly charging (DC charging) the battery cells 3b (see FIG. 1) is connected to the base portion 7a1 of the first connector 7a.

The second connector 7b includes a substantially cuboid, flat base portion 7b1 arranged on the lower base (long base) side of the trapezoidal shape in the distribution board 4.

Cable-side connectors 5b (see FIG. 3) of cables 6b (see FIG. 3) that supply electric power to multiple accessories including an A/C compressor (not shown) arranged in an engine room are connected to the base portion 7b1 of the second connector 7b. Note that three connector portions Cp are formed in the base portion 7b1 of the second connector 7b of the embodiment. Three cable-side connectors 5b (see FIG. 3) that supply electric power to three accessories (not shown), respectively, are connected to these connector portions Cp. Note that the number of connector portions Cp in the second connector 7b is not limited to three and can be changed as appropriate depending on the number of accessories to which electric power is to be supplied.

The third connector 7c includes a base portion 7c1 arranged in an upper portion of the left leg of the trapezoidal shape in the distribution board 4. The base portion 7c1 has an oval shape or a running-track shape in a front view.

A cable-side connector 5c (see FIG. 3) of a cable 6c (see FIG. 3) connected to a power control unit (not shown) is connected to the base portion 7c1 of the third connector 7c.

Note that the power control unit includes a power driving unit and a voltage conversion unit. The power driving unit is a driving circuit of an electric motor (not shown) that is a driving source of the vehicle 1 (see FIG. 1). The voltage conversion unit includes an inverter that performs DC-AC voltage conversion between the electric motor and the battery pack 3 (see FIG. 1) configured to supply electric power to the electric motor, and a DC/DC converter that steps up and down DC voltage.

The fourth connector 7d is formed of a modular jack arranged in a lower portion of the left leg of the trapezoidal shape in the distribution board 4. A cable-side connector 5d (see FIG. 3) of a cable 6d (see FIG. 3) is connected to the fourth connector 7d.

<Corrosion Prevention Structure>

Next, the corrosion prevention structure according to the embodiment is described.

Figure 3:
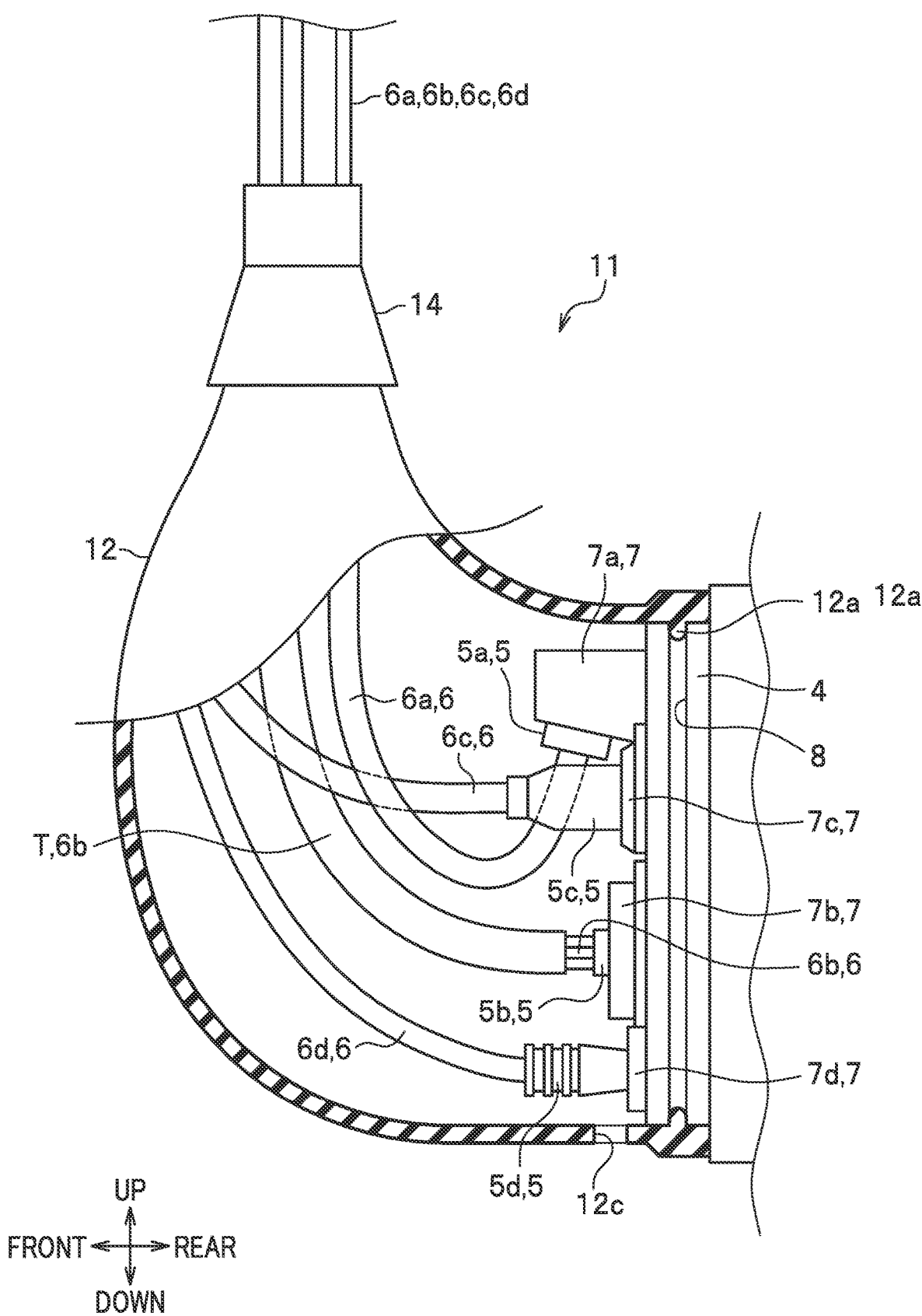
FIG. 3 is a configuration explanation view of the corrosion prevention structure for the connectors according to the embodiment of the present invention.
Figure 4:
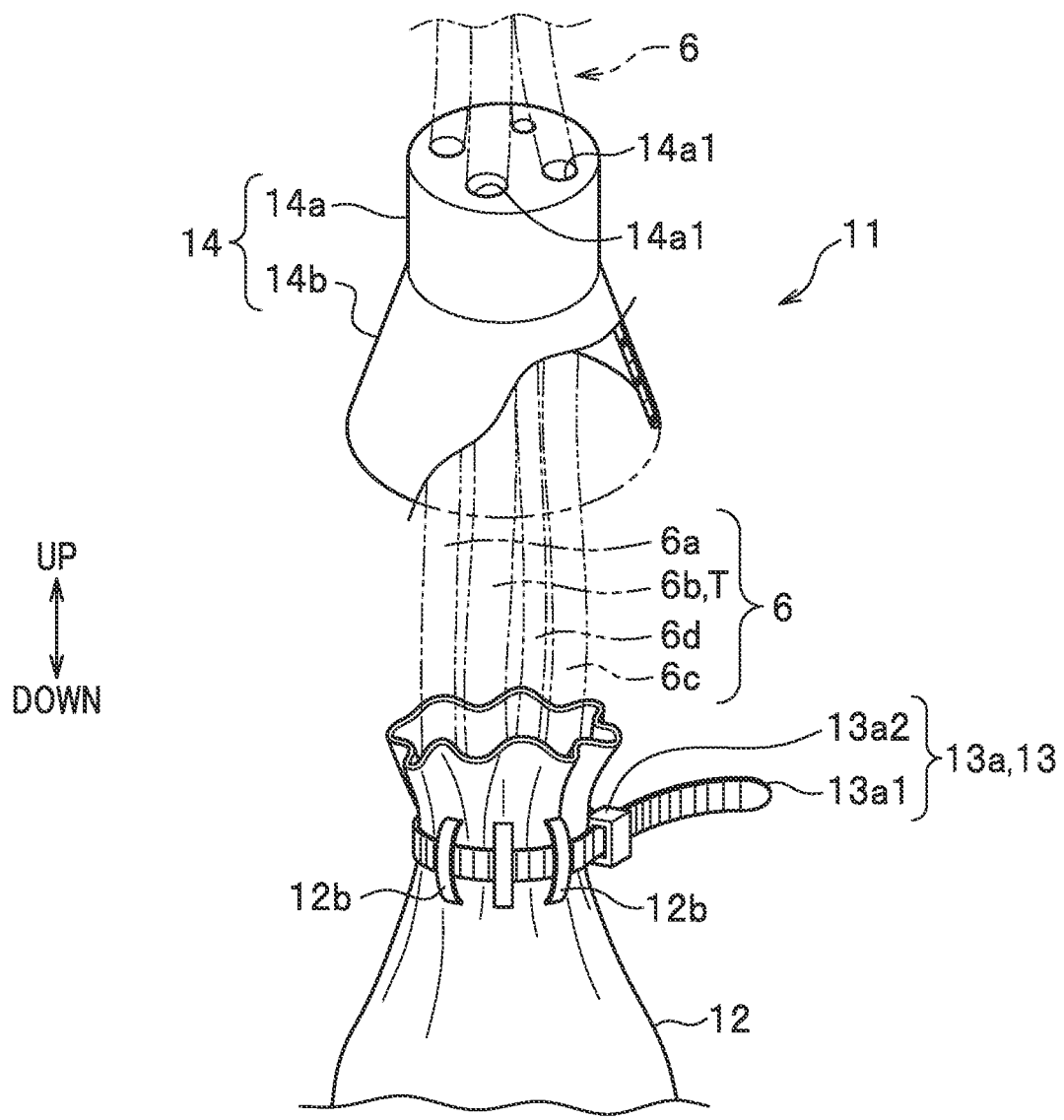
FIG. 4 is an exploded perspective view of a bundling portion in the corrosion prevention structure illustrated in FIG. 3.

FIG. 3 is a configuration explanation view of a corrosion prevention structure 11 and is a view in which a boot 12 which is a part of the corrosion prevention structure 11 is partially cut away to illustrate an interior of the boot 12. FIG. 4 is a partially exploded perspective view of the corrosion prevention structure 11 and is a view in which a clamp 13 and a bundling portion 14 of the cables 6 which is a part of the corrosion prevention structure 11 are illustrated in a partially enlarged manner. Note that, in FIG. 4, the cables 6 are illustrated by virtual lines (two-dot chain lines) for the convenience of illustration.

As illustrated in FIG. 3, the corrosion prevention structure 11 includes the boot 12 that covers the multiple connectors 7 for the power distribution together and through which the multiple cables 6 extending from the multiple cable-side connectors 5 are inserted. Moreover, as illustrated in FIG. 4, the corrosion prevention structure 11 includes the clamp 13 that tightly binds the multiple cables 6 over the boot 12 and the bundling portion 14 that bundles the multiple cables 6.

The boot 12 in the embodiment is formed of a tubular body made of elastomer such as rubber.

As illustrated in FIG. 3, a rib 12a configured to be fitted to a peripheral groove 8 formed along a peripheral side surface of the distribution board 4 is formed in an inner peripheral portion of one end portion of the boot 12. When the one end portion of the boot 12 is arranged to surround the peripheral side surface of the distribution board 4 from the outer peripheral side, the rib 12a is fitted to the peripheral groove 8 of the distribution board 4 and is fixed to the distribution board 4 by contraction force of the boot 12.

As illustrated in FIG. 3, the multiple power distribution connectors 7 including the first connector 7a, the second connector 7b, the third connector 7c, and the fourth connector 7d described above are arranged in the distribution board 4.

The one end portion of the boot 12 is fixed by being fitted to the peripheral side surface of the distribution board 4 and thereby covers these multiple power distribution connectors 7 together.

The cable 6a for quick charging is connected to the first connector 7a via the cable-side connector 5a.

Moreover, the cables 6b for accessory connection are connected to the second connector 7b via the cable-side connectors 5b. Note that the cables 6b for the accessory connection in the embodiment are integrated such that three cables 6b extending out from the three connector portions Cp (see FIG. 2) in the second connector 7b are inserted into one tube T.

Furthermore, the cable 6c for power control unit connection is connected to the third connector 7c via the cable-side connector 5c.

Moreover, the cable 6d as a signal line is connected to the fourth connector 7d via the cable-side connector 5d (a modular plug).

These cables 6a, 6b, 6c, and 6d are inserted into the boot 12 and extend to the outside of the boot 12 from the other end portion of the boot 12.

Note that a reference numeral 14 in FIG. 3 denotes the bundling portion of the cables 6a, 6b, 6c, and 6d to be described later.

Next, the other end portion of the boot 12 is described.

As illustrated in FIG. 4, the clamp 13 is arranged in the other end portion of the boot 12, that is an end portion on the opposite side to the one end portion fixed to the distribution board 4 (see FIG. 3).

The clamp 13 in the embodiment tightly binds the cables 6a, 6b, 6c, and 6d over the boot 12.

Specifically, the clamp 13 in the embodiment is assumed to be a cable tie 13a made of resin and includes a band portion 13a1 that is wound around the other end of the boot 12 in a circumferential direction and a locking portion 13a2 that has a slit through which the band portion 13a1 is inserted and that allows the band portion 13a1 to move only in a tight binding direction. Note that the clamp 13 is not limited to the cable tie 13a as long as it tightly binds the cables 6a, 6b, 6c, and 6d over the boot 12.

Moreover, multiple loop portions 12b are formed in the other end portion of the boot 12. These loop portions 12b are arranged on an outer peripheral portion of the boot 12 at predetermined intervals in the circumferential direction of the outer peripheral portion.

The loop portions 12b are formed of small bands and have rings between themselves and an outer surface of the boot 12 so that the band portion 13a1 of the cable tie 13a is inserted into the rings. The small bands forming the loop portions 12b may be formed integrally with the boot 12 in advance or may be formed separately from the boot 12 and then attached to the boot 12 later with adhesive.

Next, the bundling portion 14 (see FIG. 4) of the cables 6a, 6b, 6c, and 6d is described.

As illustrated in FIG. 4, the bundling portion 14 includes a bundling portion main body 14a and an umbrella portion 14b formed integrally with the bundling portion main body 14a. Note that the bundling portion 14 in the embodiment is assumed to be an integrally molded product made of resin.

The bundling portion main body 14a has a cylindrical shape. Moreover, insertion holes 14a1 through which the cables 6a, 6b, 6c, and 6d are individually and respectively inserted are formed in the bundling portion main body 14a. Specifically, the cables 6a, 6b, 6c, and 6d extending out from the inside of the boot 12 to the outside of the boot 12 are inserted into the respective insertion holes 14a1.

The insertion holes 14a1 are formed to extend in the axial direction of the bundling portion main body 14a and to have predetermined inner diameters. Specifically, the insertion holes 14a1 have inner diameters corresponding to the outer diameters of the respective cables 6a, 6b, 6c, and 6d. The cables 6a, 6b, 6c, and 6d are thereby inserted into the respective insertion holes 14a1 in a watertight manner.

The umbrella portion 14b has a funnel shape which has a diameter gradually increasing as a distance from one end portion of the bundling portion main body 14a in the axial direction increases.

The other end portion of the boot 12 bound by the clamp 13 is arranged inside the umbrella portion 14b.

Then, as illustrated in FIG. 4, the cables 6a, 6b, 6c, and 6d are bound by the clamp 13 and are supported by the bundling portion main body 14a by being inserted in the insertion holes 14a1.

As illustrated in FIG. 3, the cables 6a, 6b, 6c, and 6d thus have such a self-supporting property that the cables 6a, 6b, 6c, and 6d on the bundling portion 14 extend upward from the first to fourth connectors 7a, 7b, 7c, and 7d of the distribution board 4, respectively while the cables 6a, 6b, 6c, and 6d extend out from the connectors 7a, 7b, 7c, and 7d, respectively due to inflexibility of the cables 6a, 6b, 6c, and 6d together with that of the boot 12.

In the corrosion prevention structure 11 as described above, the boot 12 is shaped to extend upward near the bundling portion 14 while extending out forward from the distribution board 4.

Moreover, as illustrated in FIG. 3, in the boot 12 in the embodiment, a drainage hole 12c is formed in a lower end portion of the boot 12 in the vertical direction.

Operations and Beneficial Effects

Next, operations and beneficial effects of the corrosion prevention structure 11 according to the embodiment are described.

In the corrosion prevention structure 11 according to the embodiment, the boot 12 covers the multiple connectors 7a, 7b, 7c, and 7d for the power distribution together and the clamp 13 tightly binds the multiple cables 6a, 6b, 6c, and 6d extending from the connectors 7a, 7b, 7c, and 7d, respectively over the boot 12.

In the corrosion prevention structure 11 as described above, the boot 12 and the clamp 13 achieves corrosion prevention on the connectors 7a, 7b, 7c, and 7d exposed to an environment where there is a risk of occurrence of corrosion due to mud splash or water attachment, while achieving low cost and high workability.

Moreover, in the corrosion prevention structure 11, the boot 12 includes the loop portions 12b through which the clamp 13 is inserted.

In the corrosion prevention structure 11 as described above, the clamp 13 more surely tightly bind the cables 6a, 6b, 6c, and 6d at a predetermined position set in advance without being misaligned relative to the boot 12.

Furthermore, in the corrosion prevention structure 11, the drainage hole 12c is formed in the lower end portion of the boot 12 in the vertical direction.

In the corrosion prevention structure 11 as described above, the drainage hole 12c functions as a drain that discharges water accidentally entering the boot 12 to the outside of the boot 12 and also functions as a breathing hole that prevents condensation in the boot 12.

Moreover, the corrosion prevention structure 11 includes the bundling portion 14 bundling the multiple cables 6a, 6b, 6c, and 6d extending out from the boot 12.

In the corrosion prevention structure 11 as described above, the bundling portion 14 prevents separation of the multiple cables 6a, 6b, 6c, and 6d extending out from the boot 12.

Furthermore, the bundling portion 14 provides the self-supporting property to the cables 6a, 6b, 6c, and 6d such that the cables 6a, 6b, 6c, and 6d maintain a posture extending upward.

Moreover, in the corrosion prevention structure 11, the bundling portion 14 includes the insertion holes 14a1 through which the multiple cables 6a, 6b, 6c, and 6d are inserted, respectively, in a watertight manner and the umbrella portion 14b that covers the upper end portion of the boot 12 tightly bounded by the clamp 13.

In the corrosion prevention structure 11 as described above, the bundling portion 14 more surely blocks water attempting to enter the boot 12 along the cables 6a, 6b, 6c, and 6d extending out from the boot 12.

The embodiment of the present invention has been described above. However, the present invention is not limited to the aforementioned embodiment and carried out in various modes.

What is claimed is:

1. A corrosion prevention structure for connectors, comprising:
   a boot which covers plural connectors for power distribution collected together and through which plural cables extending respectively from the plural connectors are inserted;
   a clamp which tightly binds the plural cables over the boot; and a bundling portion of the plural cables extending out from the boot,
wherein the bundling portion includes: insertion holes through which the plural cables are watertightly inserted, respectively; and an umbrella portion which covers an end portion of the boot tightly bound by the clamp.

2. The corrosion prevention structure for connectors according to claim 1, wherein the boot includes a loop portion through which the clamp is inserted.

3. The corrosion prevention structure for connectors according to claim 1, wherein a drainage hole is formed in another end portion of the boot in a vertical direction.

\* \* \* \* \*